Patented May 26, 1953

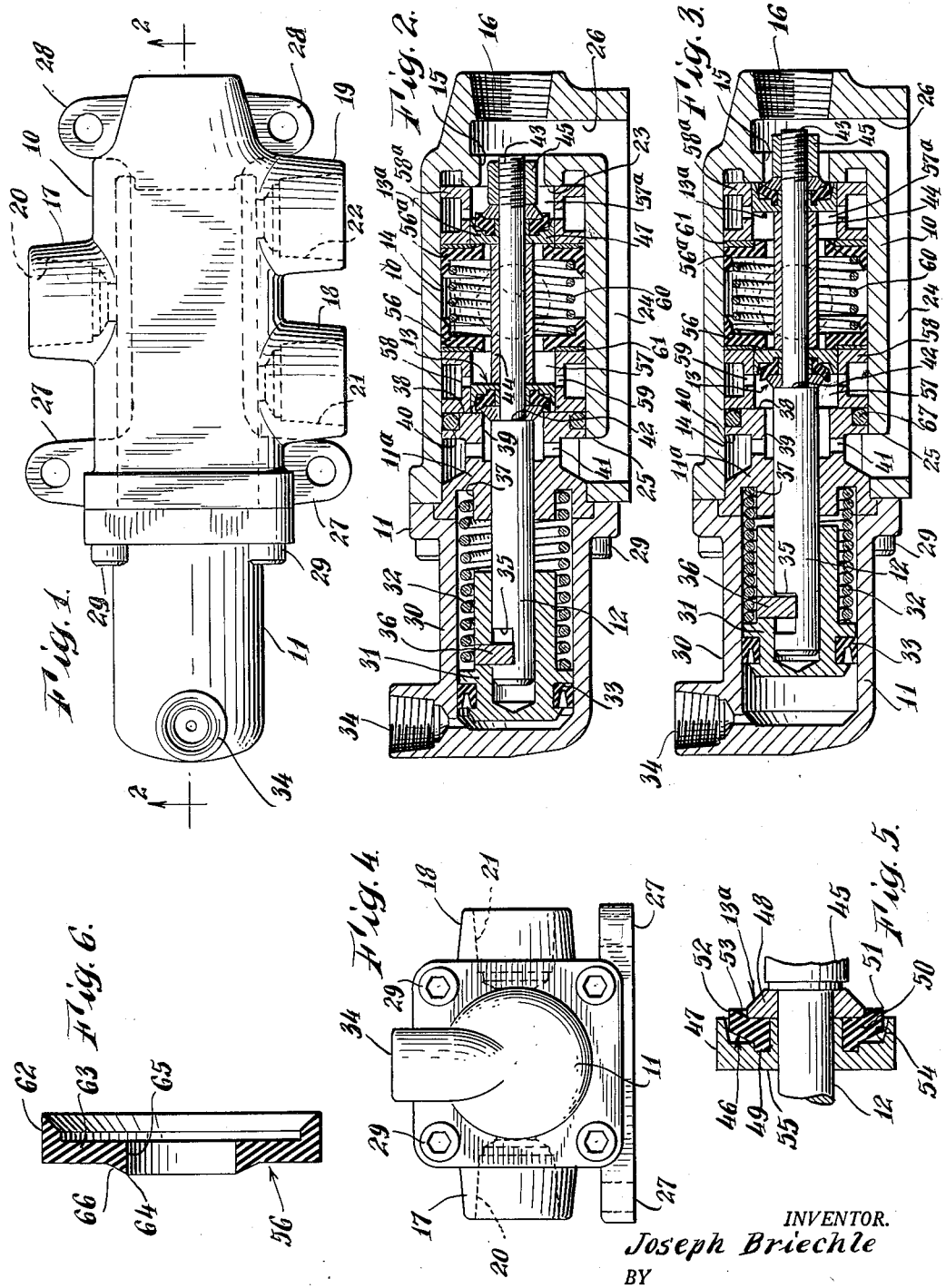

2,639,728

UNITED STATES PATENT OFFICE 2,639,728

FOUR-WAY VALVE

Joseph Briechle, Floral Park, N. Y., assignor to Scovill Manufacturing Company, Waterbury, Conn., a corporation of Connecticut Application January 4, 1950, Serial No. 136,770

9 Claims. (Cl. 137—622)

My present invention relates to multiple-way valves and more particularly to four-way valves of the type employed in controlling double-acting pistons or equivalent pneumatic motor means, and aims to provide certain improvements in such valves.

Among the objects of my invention are to provide a four-way valve which is simple and exceedingly compact in construction, which is economical to produce because of the absence of movable leak-tight pistons and which is highly efficient in use and has long life.

The foregoing and other objects of my invention not specifically enumerated are accomplished by the four-way valve mechanism, a preferred embodiment of which is hereinafter described and illustrated in the accompanying drawings, wherein—

Figure 1 is a top plan view of a four-way valve embodying my invention.

Fig. 2 is a diametrical section taken along the plane of the line 2—2 of the valve mechanism of Fig. 1 showing the operating parts in one limiting position.

Fig. 3 is a section similar to that of Fig. 2 showing the operating parts in another limiting position.

Fig. 4 is an end elevation of the valve shown in Fig. 1 as viewed from the left end thereof.

Fig. 5 is a diametrical section on an enlarged scale of a poppet valve assembly constituting a novel feature of my invention.

Fig. 6 is a diametrical section on an enlarged scale of a packing seal constituting a novel feature of my invention.

Referring to the drawings, the multiple-way valve mechanism may be said to basically comprise a body member or casing 10 having a bore therethrough, one end of which is closed by a head 11 which serves to hold an end plug 11a within the body and through which plug extends a slidable shaft 12 movable axially of the body member and having mounted thereon a pair of axially spaced, double-acting poppet valves 13 and 13a adapted to coact with valve seats, as will be presently explained.

The body member or casing 10 is of generally elongate shape and is formed with a cylindrical bore 14 extending inwardly from the plug accommodating end thereof and with a reduced bore 15 which terminates at the opposite end of the body in an internally screw-threaded portion 16 adapted for connection with a pipe or hose coupling or the like. Extending outwardly from the body portion, preferably on opposite sides of a vertical central plane extending therethrough, are protuberances 17, 18 and 19 each formed with a screw-threaded opening therethrough leading into the bore 14 and each adapted for connection with a pipe or hose coupling, the passage 20 through the protuberance 17 constituting a pressure fluid inlet to the body member and the passages 21 and 22 through the protuberances 18 and 19, respectively, constituting outlets leading to pressure operable devices, such as a double acting pressure operable piston in a cylinder. The end wall of the body member between the bores 14 and 15 is formed with a flat end face 23 which constitutes one seat for the double-acting poppet valve 13a, as will be presently explained. The base of the body member is formed with a duct or passage 24 which, at one end, has an upright component 25 leading into the cylindrical bore 14 and at its other end has an upright component 26 leading into the bore 23. For securing the body member upon a suitable mounting, said body member is formed with laterally projecting, pierced lugs 27 and 28.

The head 11, in addition to providing a closure for one end of the body member 10 to which it may be suitably affixed by bolts 29 and for holding the plug 11a within the body member, also serves in the present embodiment of my invention to house means for reversing the flow of fluid through the valve mechanism. To accomplish this, the head 11 is formed with a cylinder 30 having a piston 31 slidable therein and urged in one direction by a coil spring 32, said piston being packed for air-tightness with an annular V-shaped packing 33. The piston 31 is hollow and accommodates within its bore one end of the shaft 12. To move the shaft 12 upon admission into the cylinder 30 of fluid under pressure through a coupling nipple 34, the shaft is formed with a recess 35 into which extends a pin 36 carried by the piston 31.

The plug 11a is formed at its outer end with an annular recess 37 for accommodating the end of the spring 32 and at its inner end is formed with a flat face 38 which constitutes a valve seat for the double-acting poppet valve 13. As aforementioned, the plug 11a constitutes a bearing through which the shaft 12 is axially slidable, and axially inward of said bearing the plug is formed with an enlarged bore 39, an external annular recess 40 in open communication with the passage 25 and with radial openings 41 between said bore 39 and recess 40.

The major portion of the shaft 12 which extends into bore 14 of the body member is of reduced diameter and provides with the shaft portion of larger diameter a shoulder 42 and at its free end is screw-threaded, as indicated at 43. Mounted on said shaft portion of reduced diameter are the double-acting poppet valves 13 and 13a, said valves being held in definite axially spaced relation by a spacing sleeve 44 and a retaining nut 45.

The poppet valves 13 and 13a are of identical construction but are reversely disposed on the shaft 12, and each of said poppet valves, one of which is shown in enlarged detail in Fig. 5, consists of a packing washer 46 mounted in a retainer 47 and held therein by a clamping washer 48. The packing washer 46 has a substantially cylindrical central axial portion 49 and a substantially radial portion 50, the contact edge 51 of which is adapted to seat against the flat valve seats 23 or 38 previously described. The edge 51 may be said to be provided by the intersection of a substantially cylindrical surface 52 with a conical surface 53 of the radial portion 50 of the gasket. To allow for flexing and deforming of said edge 51 the gasket retainer is cut back to provide an obtuse annular dihedral angle 54. The retainer on its opposite face is substantially flat, as shown at 55, and constitutes a valve seat for flexible packing seals, presently to be described.

The cylindrical bore 14 in the body 10 is divided by a pair of flexible packing seals 56 and 56a, disposed on axially opposite sides of the passage 20, into end chambers 57 and 57a within which the poppet valves 13 and 13a, respectively, are movable. Also mounted within said chambers 57 and 57a are annular cages 58 and 58a communicating respectively with the passages 21 and 22, said cages being formed with radial openings 59 in their bases for establishing communication between the chambers 57 and 57a and the passages 21 and 22, respectively. To hold the flexible packing seals 56 and 56a and the annular cages 58 and 58a in their respective positions, a coil spring 60 is disposed between the flexible packing seals to abut thereagainst. If desired, filler or spacer rings 61 may be disposed between the packing seals and the annular cages.

The flexible packing seals 56 and 56a are identical and are each formed with a peripheral cylindrical flange 62 adapted to make air-tight contact with the bore of the body member, a substantially flat radial portion 63 and a contact edge 64 constituting a flexible valve seat at the intersection of a substantially cylindrical bore surface 65 and a conical surface 66 (Fig. 6). In this connection it is to be noted that the valve seat 64 extends radially inward beyond the inner boundary of the spacer ring 61 so as not to impair the flexibility of said valve seat.

The effective areas of the poppet valve packing washers 46 which coact with the valve seats 23 and 38 at the remote ends of chambers 57a and 57, respectively, to exhaust, are larger than the effective area of the contact edge 64 of the packing seals 56 and 56a which coact with the flat faces 55 on the retainers 47 of the poppet valves so that fluid pressure acting on the poppet valves to seat them against the exhaust valve seats 23 and 38 would normally hold said valves in either of the two valve seating positions to which they had been moved. In order that this may be accomplished, it is to be understood that the retainers 47 do not provide a leak-tight seal with the inner circumferential surfaces of the cages. Accordingly, upon admission of fluid pressure through the passage 20 the parts would remain in equilibrium. However, in view of the force of the spring 32 acting to hold the shaft 12 at the extreme left (as shown in Fig. 2), it will be apparent that normally the contact edge 64 on packing seal 56a will seat against the retainer ring 47 of poppet valve 13a, wherefore incoming pressure will pass into chamber 57, then through the openings 59 into the cage 58 and from the cage 58 to the passage 21 leading to a fluid operated motor to do useful work, while pressure fluid from passage 22 will exhaust to atmosphere through cage 58a, chamber 57a and bore 15. To reverse the operation of the fluid operated motor, the shaft 12 must be moved to the right to provide a seal between the contact edge 64 on flexible packing 56 and the retainer of poppet valve 13, which movement will simultaneously open the seal between contact edge 64 on flexible packing 56a and retainer of poppet valve 13a and provide a seal between the contact edge 51 of poppet valve 13a and the valve seat 23, as shown in Fig. 3. Such movement of the shaft 12 may be accomplished in numerous ways, for example, by pilot operated pressure upon the piston 31, as herein shown, or by any suitable manual, mechanical or electrically operated means. Ordinarily in a four-way valve of the type here disclosed, the reversal of the fluid through the valve mechanism, may take place many hundred times a minute with comparatively little wear on the valves because of their novel construction and flexing action in operation.

From the foregoing detailed description it will be apparent that the construction and assembly of the four-way valve is exceedingly simple and that the entire mechanism contained within the body member can be inserted as a unit through one end of the body member after being first mounted on the shaft 12, or, if desired, said parts can be successively introduced into the body member from one end thereof. Furthermore, the assembly can be accomplished with but a single packing to prevent leakage during operation and that practically all detrimental leakage through the device may be checked through the use of a single O-ring 67 mounted within the bore 14 between the inner end of the plug 11a and the cage 58.

While I have shown a compact and highly efficient four-way valve structure, it will be understood that modifications in details of construction may be made within the range of engineering skill without departing from the spirit of the invention as defined in the appended claims.

What I claim is:

1. In a multiple-way valve mechanism, the combination of a body having a cylindrical bore, a pair of axially spaced annular packing seals dividing said bore into two end chambers in which alternately fluid pressure is to be established, a pressure fluid supply passage between said packing seals adapted to be selectively placed in communication with each of said two chambers through the central openings in said packing seals, said packing seals each having a valve seat reversely arranged relatively to the other and directed toward an end chamber, an exhaust valve seat at the remote end of each of the chambers directed toward one another, an axially movable shaft extending through said chambers and having fixedly mounted thereon a pair of axially spaced double-acting poppet valve members each adapted for coacting with a valve seat on the packing seal and a valve seat of a respective chamber to close simultaneously the supply of pressure fluid to one chamber and the exhaust of pressure from the other chamber.

2. A multiple-way valve mechanism according to claim 1 wherein the valve seats on the packing seals are deformable and provide leak-tight seals with non-deformable faces on the poppet valves.

3. A multiple-way valve mechanism according to claim 1 wherein the chamber valve seats are non-deformable and provide leak-tight seals with deformable packings on the poppet valves.

4. A multiple-way valve mechanism according to claim 1 wherein the double-acting poppet valves each has a non-deformable face adapted to provide a leak-tight seal with the valve seat on a packing seal, and a deformable packing adapted to make a leak-tight seal with the chamber valve seat.

5. In a multiple-way valve mechanism, the combination of a body having a cylindrical bore, said body having adjacent each end a passage to the atmosphere and intermediate said ends a pressure fluid inlet passage and two outlet passages adapted for connection to pressure operable devices, each of said outlet passages being spaced axially of the inlet passage on opposite sides thereof, means dividing the bore into end chambers each in communication with an outlet passage and adapted for selective communication with the inlet passage or the passage to atmosphere, a slidable shaft extending axially through said chambers and having fixedly mounted thereon a pair of axially spaced poppet valves each disposed for movement within an end chamber, and valve seats at the ends of said chambers on which valve seats the poppet valves are adapted to seat as the shaft is moved to close simultaneously the supply of pressure fluid to one chamber and exhaust the pressure fluid from the outlet passage of the other chamber to the atmosphere, the means dividing the body bore into chambers, the shaft, and the poppet valves being insertable into the body through one end thereof.

6. A multiple-way valve mechanism according to claim 5 wherein the parts insertable into the body are held therein by an end plug which provides a bearing for the slidable shaft.

7. A multiple-way valve mechanism according to claim 5 wherein each of the end chambers has mounted therein an annular cage providing a support for the means for dividing the bore into end chambers, and said cages each having openings therein through which open communication is established between a chamber and the outlet passage leading to the pressure operable device.

8. A multiple-way valve mechanism according to claim 5 wherein the means for dividing the bore in the body into chambers are a pair of disc-like annular packing seals.

9. A multiple-way valve mechanism according to claim 5 wherein each of the end chambers has mounted therein in an annular cage, the means for dividing the bore in the body into chambers are a pair of disc-like annular packing seals, and spring means for holding the packing seals against the cages and the cages in position within the body.

JOSEPH BRIECHLE.

References Cited in the file of this patent

UNITED STATES PATENTS

| Number | Name | Date |
| --- | --- | --- |
| 1,216,354 | Perkins | Feb. 20, 1917 |
| 1,836,184 | Nixon | Dec. 15, 1931 |
| 2,208,188 | Johnston | July 16, 1940 |
| 2,270,838 | Langdon | Jan. 20, 1942 |
| 2,395,941 | Rockwell | Mar. 5, 1946 |
| 2,441,201 | Ludwig | May 11, 1948 |
| 2,503,827 | Langmore | Apr. 11, 1950 |
| 2,542,254 | Lamb | Feb. 20, 1951 |

FOREIGN PATENTS

| Number | Country | Date |
| --- | --- | --- |
| 765,827 | France | June 4, 1934 |